United States Patent [19]

Monie et al.

[11] Patent Number: 5,306,181
[45] Date of Patent: Apr. 26, 1994

[54] PLANER FUSE PANEL

[75] Inventors: Wayne G. Monie, Scottsdale; Scott J. Raffles, Queen Creek; Benjamin L. Richie, Jr.; Joseph V. Woodley, both of Scottsdale, all of Ariz.

[73] Assignee: Rogers Corporation, Rogers, Conn.

[21] Appl. No.: 25,043

[22] Filed: Mar. 1, 1993

[51] Int. Cl.⁵ .................................. H01R 33/95
[52] U.S. Cl. .......................... 439/621; 361/626; 439/55
[58] Field of Search ............. 439/621, 55, 622; 361/349, 355, 430, 431

[56] References Cited

U.S. PATENT DOCUMENTS

| | | | |
|---|---|---|---|
| 2,116,269 | 5/1938 | Kobzy | 29/874 |
| 3,140,364 | 7/1964 | Swanke et al. | 200/11 K |
| 3,457,640 | 7/1969 | Rayburn | 29/884 |
| 3,618,207 | 11/1971 | Sand et al. | 29/882 |
| 4,197,636 | 4/1980 | Osanai | 29/882 |
| 4,337,574 | 7/1982 | Hughes et al. | 29/883 |
| 4,599,679 | 7/1986 | Baader | 361/349 |
| 4,616,416 | 10/1986 | Cabaud | 29/884 |
| 4,712,299 | 12/1987 | Loewen et al. | 29/882 |
| 4,801,278 | 1/1989 | Sappington | 439/746 |
| 4,872,262 | 10/1989 | Marach | 29/884 |
| 4,938,715 | 7/1990 | Jones et al. | 439/621 |
| 4,944,691 | 7/1990 | Marach | 439/621 |
| 5,073,131 | 12/1991 | Levine | 439/621 |
| 5,113,168 | 5/1992 | Lindquist | 337/187 |

*Primary Examiner*—Gary F. Paumen
*Attorney, Agent, or Firm*—Fishman, Dionne & Cantor

[57] ABSTRACT

A planer fuse panel is presented. In accordance with the present invention, a section of conductive metal of the desired thickness, temper and shape is stamped out from a sheet of conductive metal. Simultaneously, fuse holding spring or bent tabs are formed in the same stamping operation for frictionally engaging blades from blade-type fuses. The edges of the fuse panel include a plurality of male blade connectors of a known configuration. A multiplicity of circuits may be included in the planer fuse panel depending on the number of circuits desired. The circuits may have any suitable planar shape. In a preferred embodiment, each circuit has an overall rectangular shape with a first portion consisting of an "L" shaped element and a second portion comprising a rectangular shaped element located in the shoulder of the first element. Spaces are formed bridging the two portions of each circuit with bent tabs extending into each space to frictionally engage a blade-type terminal from a fuse or the like. The conductive metal is appropriately finished and/or plated and then insulative layers, such as polyester or polyimide film, are applied (e.g., laminated) to both surfaces of the metal in sheet form.

12 Claims, 3 Drawing Sheets

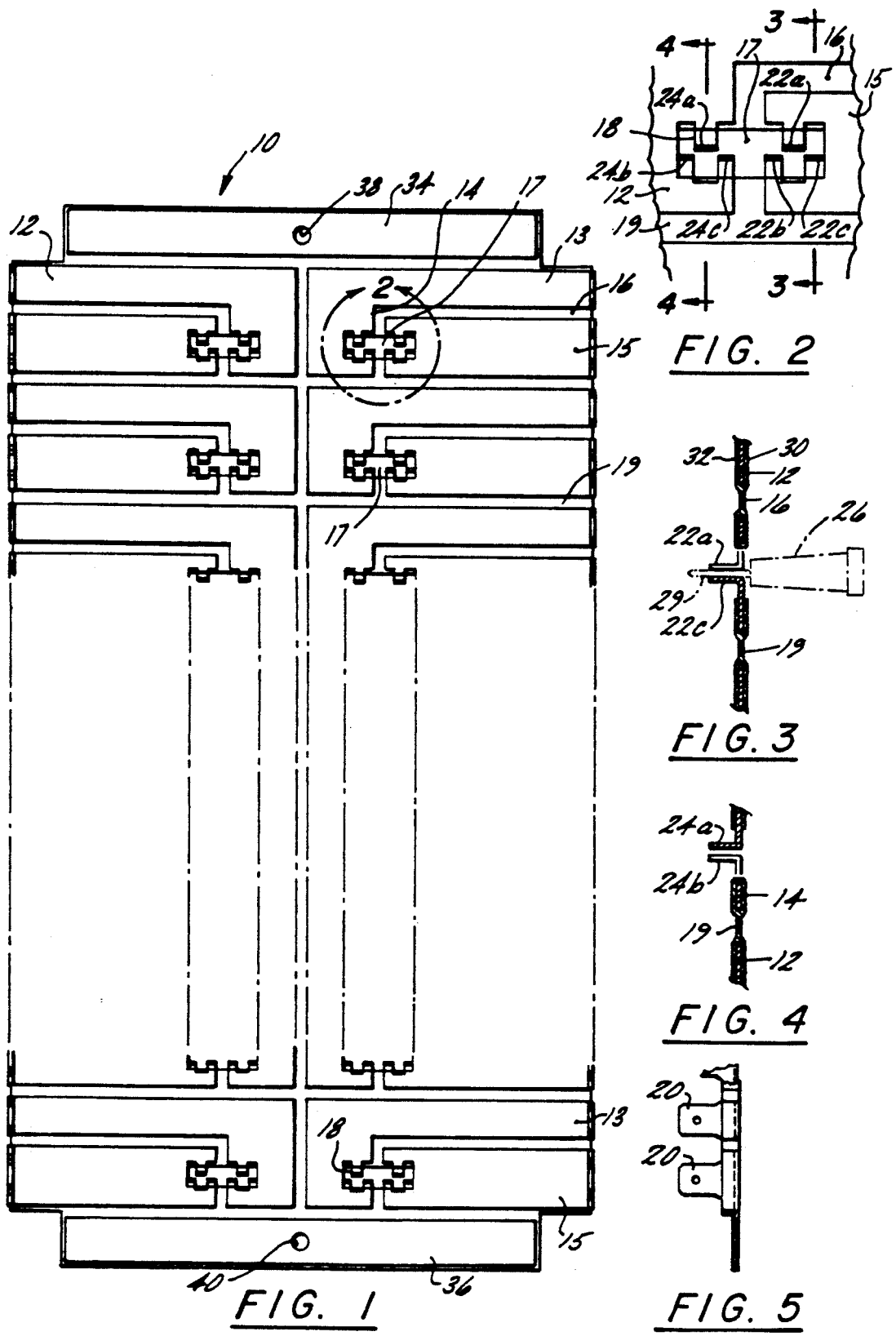

PLANER FUSE PANEL

BACKGROUND OF THE INVENTION

The present invention relates generally to fuse holders for replaceable electrical circuit elements such as fuses and the like. More particularly, this invention relates to a novel one piece planar fuse holder that may be directly retained by the connecting power distribution circuitry which eliminates the need for separable discrete fuse holders in the circuitry. This invention is particularly well suited for use in motor vehicle applications.

There are several prior art fuse holders that incorporate stamping and forming methods to mass produce contact terminals. This prior art is exemplified by U.S. Pat. No. 4,616,416 to Cabraud and U.S. Pat. No. 4,712,299 to Loewen et al. However, both of these patents apply only to the metal terminal elements of fuse holders or other electrical connectors.

Prior art U.S. Pat. No. 4,872,262 to David R. Marach does address the need for a fuse holder for replaceable circuit elements having blade-type terminals. Such fuses are well known in the industry and comprise a pair of spaced blades partially enclosed in an insulative housing. The blades are interconnected within the housing by a conductive interconnect which self-destructs at a preselected amperage. The blades extend from the housing for frictional connection to a suitable, typically plastic housing. Examples of such fuses include "ATC" fuses manufactured by Cooper Industries, Inc. of Houston Tex. and "ATO" fuses manufactured by Littelfuse. Blade-type fuses have found widespread use in electrical systems found in automobiles, motorboats and many other products.

The disclosure of U.S. Pat. No. 4,872,262 does show improvements and economies over prior art. However, U.S. Pat. No. 4,872,262 still suffers from certain drawbacks such as requiring a multiplicity of parts as well as requiring separate fuse holder blocks for separate circuits. In addition, the design disclosed in U.S. Pat. No. 4,872,262 requires considerable guidance for fuse insertion because of the configuration of the contact tabs. The fuse holder of U.S. Pat. No. 4,872,262 also requires expensive injection molding components. Other patents of interest in this area, which pose similar or other problems, include U.S. Pat. Nos. 2,116,269, 3,140,364; 3,457,640; 3,618,207; 4,197,636; 4,337,574; 4,801,278; 4,938,715 and 5,113,168.

SUMMARY OF THE INVENTION

The above-discussed and other drawbacks and deficiencies of the prior art are overcome or alleviated by the planer fuse panel of the present invention. In accordance with the present invention, a section of conductive metal of the desired thickness, temper and shape is stamped out from a sheet of conductive metal. Simultaneously, fuse holding spring or bent tabs are formed in the same stamping operation for frictionally engaging blades from blade-type fuses. The edges of the fuse panel include a plurality of male blade connectors of a known configuration. A multiplicity of circuits may be included in the planer fuse panel depending on the number of circuits desired. The circuits may have any suitable planar shape. In a preferred embodiment, each circuit has an overall rectangular shape with a first portion consisting of an "L" shaped element and a second portion comprising a rectangular shaped element located in the shoulder of the first element. Spaces are formed bridging the two portions of each circuit with bent tabs extending into each space to frictionally engage a blade-type terminal from a fuse or the like. The conductive metal is appropriately finished and/or plated and then insulative layers, such as polyester or polyimide film, are applied (e.g., laminated) to both surfaces of the metal in sheet form.

In an alternative embodiment, the fuse panel may include two metal layers with a first layer acting as the current carrying medium and a second layer having greater resiliency to normally maintain the second layer in contact with the first layer.

The present invention exhibits a low profile configuration which eliminates the need for terminal blocks and precludes crimping or soldering operations. Custom configurations can be made quickly and inexpensively designed on computerized numerically controlled equipment. An important feature is that the planer fuse panel of the present invention is much more economical to design and produce then prior art holders for blade-type circuit elements such as those fuse holders disclosed in U.S. Pat. No. 4,872,262.

The present invention is thus both simple to design, manufacture and much more inexpensive to produce. The present invention can also readily accommodate other electrical or electronic components such as relays, and the like. Another important feature of the present invention relative to prior art such as disclosed in U.S. Pat. No. 4,872,262, is that each electrical or electronic element or fuse can be positioned on a totally different circuit (e.g., not tied to a common power source as is required in U.S. Pat. No. 4,872,262). In addition, the present invention can use a common power source (if required) with ease or any combination of circuitry as desired.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 1 is a plan view of the preferred embodiment of the planer fuse panel of the present invention;

FIG. 2 is an enlarged detailed plan view of the area encircled as 2 in FIG. 1;

FIG. 3 is a cross-sectional elevation view of the planer fuse panel of FIG. 2 along the line 3—3 of FIG. 2;

FIG. 4 is a cross-sectional elevation view of the planer fuse panel of FIG. 2 along the line 4—4 of FIG. 2;

FIG. 5 is a partial elevated side view of the planer fuse panel of FIG. 1;

DESCRIPTION OF THE PREFERRED EMBODIMENT

Figure 6:
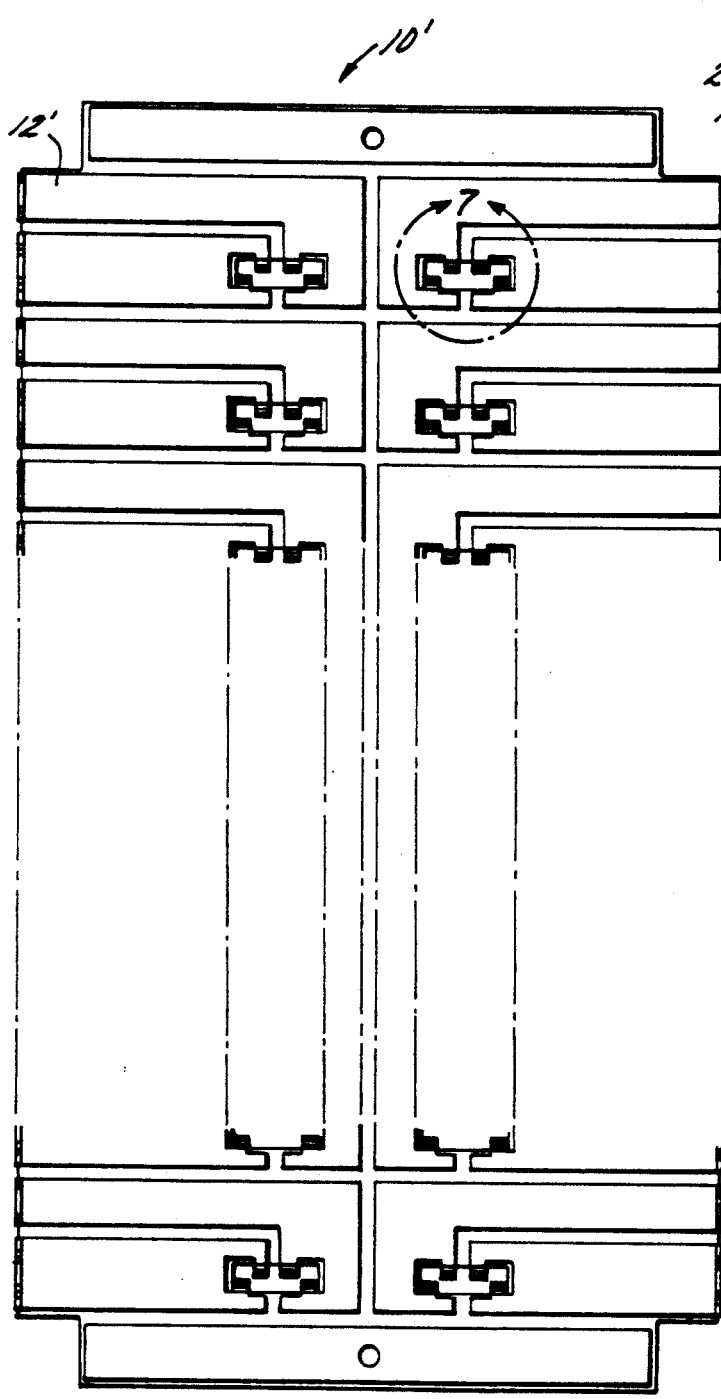
FIG. 6 is a plan view of an alternate embodiment of the planer fuse panel of the present invention.

A preferred embodiment of the planer fuse panel in accordance with the present invention is shown in plan view in FIG. 1. Referring jointly now to FIGS. 1-5, a preferred embodiment of the present invention is shown generally at 10. Planer fuse panel 10 comprises an electrical bus member or terminal plate 12. Terminal plate 12 is composed of a resilient metal such as copper or brass in thicknesses suitable to carry the intended electrical load. Electrical bus member 12 is sandwiched between two layers of insulation 30 and 32, preferably applied by heat and pressure in a lamination process. Bus member 12 has stamped therein a multitude of discrete, spaced planar circuits with each circuit preferably having an overall rectangular configuration. In the FIG. 1 embodiment, each discrete circuit comprises a first element having a "L" shape and a second rectangularly shaped element 15 disposed adjacent to, but spaced from the shoulder or step 14 in "L" shaped element 13, with a corresponding "L" shape gap 16 thus being defined between elements 13 and 15. Each discrete circuit (composed of elements 13 and 15) are spaced from each other by a border 19 defined by insulative film 30, 32.

Electrical bus member 12 has a plurality of rectangular spaces 17 with a single space 17 being disposed between pairs of elements 13 and 15 and across gap 16. Each space 17 includes a plurality of fuse terminal members 18 extending into space 17. Each terminal member 18 terminates at an integral fuse terminal 22 and 23. Integral fuse terminal or bent tab 22 extending from element 15 consists of three pressure tabs 22a, 22b and 22c. Fuse terminal 22 is aligned and spaced apart from a corresponding fuse terminal 23 on element 13 which also consists of three pressure tabs 24a, 24b and 24c. In the particular embodiment illustrated in the drawings, the fuse terminals 22 and 24 are pressure clip terminals comprising bent tabs which are adapted to accept and frictionally engage and retain the generally flat blade portions of a plug-in fuse. Accordingly, tabs 22b and 22c are spaced from tab 22a to define a slit having a width slightly less than the width of a blade type terminal. Similarly, tabs 24b and 24c are spaced from tab 24s in a similar manner. It will be appreciated that tabs 22b and 22c are coplanar and opposed from, but offset to, tab 22a. Similarly, tabs 24b and 24c are coplanar and opposed from, but offset to, tab 24a. The electrical bus member 12, in this particular embodiment, is adapted to be connected to any power source or load by means of a multiplicity of electrical terminals 20 which are standard spade quick-connect terminals extending from each element 13, 15 either in coplanar relationship or at an angle to terminal plate 12. Terminals 20 are mutually aligned and arranged on opposed, longitudinal edges of substantially rectangular planar sheet 12. Insulation layers 30 and 32 can be made from polyester or polyimide (or any other suitable material), both of which are flame retardant.

Referring now to FIG. 3 which is a cross-sectional elevation view of the planer fuse panel of FIG. 2 along the line 3—3 of FIG. 2. The low profile of the planer fuse panel is clearly shown. A blade-type fuse 26 (in phantom) is shown inserted between two (22a and 22c) of the three tabs frictionally engaging and retaining one blade 29 of the blade-type fuse. It will be appreciated that the resilient nature of tabs 22, 24 permit blade 29 to deflect the tabs outwardly and allow a strong frictional engagement. In this cross-section, it is seen how electrical bus member 12 is sandwiched between layers of insulation 30 and 32. FIG. 4 is a similar cross-sectional elevation view along the line 4—4 of FIG. 2. Retaining tabs 24a and 24b are shown for retaining the second blade of the blade-type fuse. Again, the unique sandwiching of electrical bus member 12 between insulation layers 30 and 32 is clearly shown.

FIG. 5, which is a partial elevated side view of the planer fuse panel of FIG. 1 shows two of the electrical terminals 20 and their relationship to the fuse terminals 18 via the electrical bus members 12. In this case, terminals 20 are bent an angle of 90 degrees with respect to plate 12. At opposed ends of fuse panel 10, adjacent bus member 12, are extension tabs 34 and 36 with each extension tab containing an opening 38, 40, respectively. Extension tabs 34, 36 are coplanar with fuse plane 12 and are stamped out simultaneously with the initial stamping operation. Tabs 34 and 36 are similarly laminated between the two non-conductive films 30, 32. Extension tabs 34 and 36 together with openings 38, 40 are for the purpose of mounting fuse panel 10. It will be appreciated that in a preferred embodiment, insulative film 30, 32 fully encapsulates planar sheet 12 with the exception of terminals 20, space 17 and bent tabs 22, 24.

Figure 7:
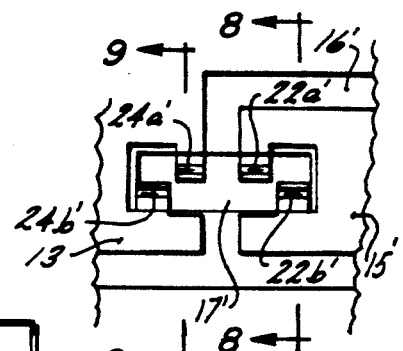
FIG. 7 is an enlarged detailed plan view of the area encircled as 7 in FIG. 1.
Figure 8:
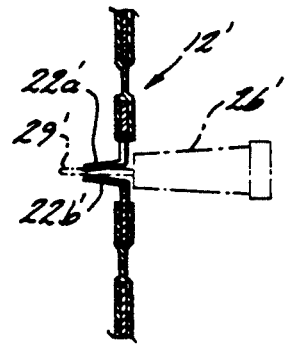
FIG. 8 is a cross-sectional elevation view of the planer fuse panel of FIG. 7 along the line 8—8 of FIG. 7.
Figure 9:
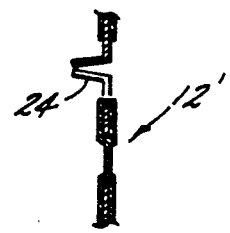
FIG. 9 is a cross-sectional elevation view of the planer fuse panel of FIG. 7 along the lines 9—9 of FIG. 7.
Figure 10:
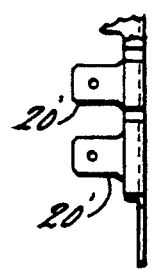
FIG. 10 is a partial elevated side view of the planer fuse panel of FIG. 6.
Figure 11:
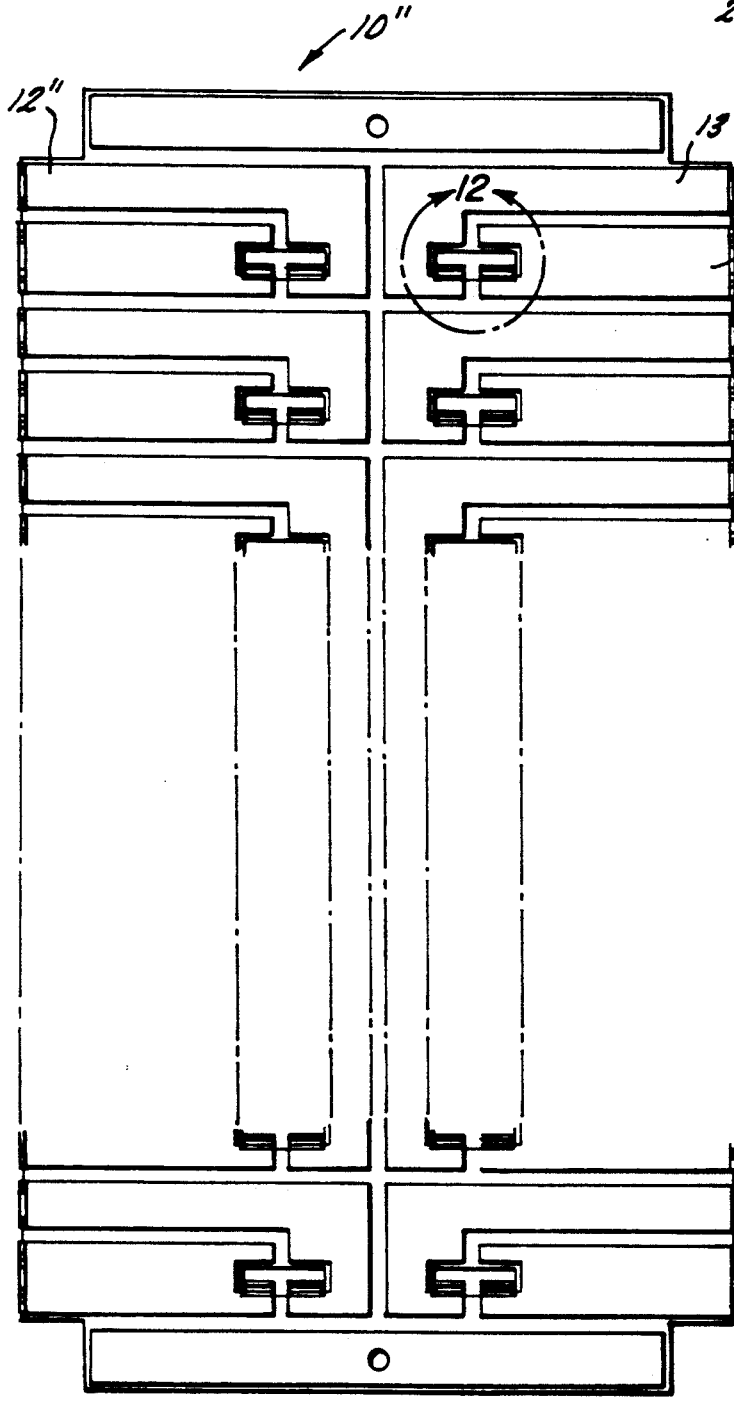
FIG. 11 is a plan view of still another alternate embodiment of the planer fuse panel of the present invention.
Figure 12:
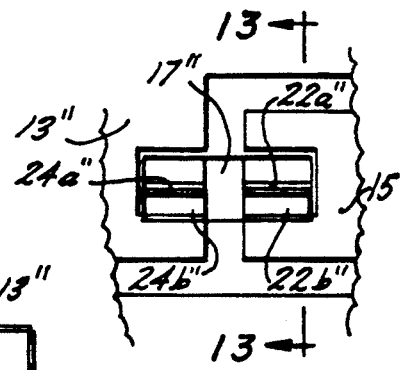
FIG. 12 is an enlarged detailed plan view of the area encircled as 12 in FIG. 11.

Turning now to FIGS. 6-10, an alternative embodiment of the present invention is shown generally at 10'. It will be appreciated that in this alternative embodiment of FIGS. 6-10 (as well as a second alternative embodiment in FIGS. 11-14), all of the common elements would be marked with the same numbers as in the FIG. 1 embodiment with the addition of a prime or double prime. The FIGS. 6-10 embodiment differs from the FIG. 1 embodiment only in the configuration of the tabs 22', 24' for frictionally engaging a blade 29' from a fuse 26'. As best shown in FIG. 7, rather than each connective element 13 and 15 of a particular circuit comprising three tabs for a total of six tabs, in the embodiment of FIG. 6, each element 13', 15' includes only two tabs for a total of four engaging tabs. In the FIG. 6 embodiment, element 15 includes a pair of spaced tabs 22a' and 22b' while element 15 includes a pair of spaced tabs 24a', 24b'. Tabs 22a', 22b', on the one hand, and tabs 24a', 24b' on the other hand are disposed and off-set from one another again to define a slot having a width which is slightly less than the width of a blade 29' so that the tabs are resiliently deformed upon insertion of the blade and then urged together to form a tight friction fit.

Figure 13:
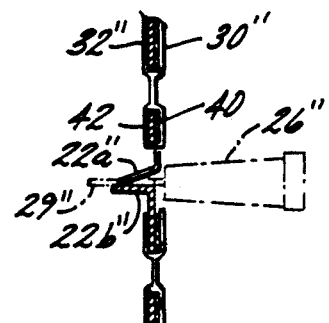
FIG. 13 is a cross-sectional elevation view of the planer fuse panel of FIG. 12 along the line 13—13 of FIG. 12.
Figure 14:
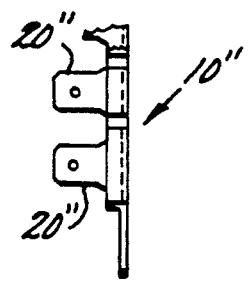
FIG. 14 is a partial elevated side view of the planer fuse panel of FIG. 11.

Turning now to the alternative embodiment of FIGS. 11-14, a planer fuse plate is shown at 10". In the alternative embodiment of FIG. 11, each element 13" and 15" of a particular circuit is comprised of two metal layers 40 and 42 as best shown in FIG. 13. In this embodiment, the space 17" includes a total of four tabs 22, 24 with element 15" having a tab 22a" and 22b" and element 13"

having two tabs 24a" and 24b". Preferably, metal layer 32 is slightly thicker than metal layer 40 and the tabs 22a" and 24a" extending from metal layers 40 are angled towards and normally in contact with bent tabs 22b" and 24b" as shown in FIG. 13. In this two metal layer embodiment, metal layer 42 is intended to carry the current while metal layer 40 supplies the spring force to normally contact layer 40 prior to insertion of a blade 29" from fuse 26". Metal layers 40 and 42 are both sandwiched between nonconductive polymeric films 30" and 32" as in the previously discussed embodiments.

It will be appreciated that fuse holder 10 may also be used as a power and signal plane to carry electrical signals and/or power, in addition to holding fuses.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A fuse retainer comprising:
   planar resilient metal sheet means having a plurality of discrete, spaced planar circuits formed therein and electrically insulated from one another, each circuit comprising a first element having a first shape and a second element having a second shape, said first element being spaced from said second element by an insulative gap;
   a space formed through each of said circuits and bridging said first element, said second element and said gap;
   first bent resilient tab means extending from said first element and into said space;
   second resilient bent tab means extending from said second element into said space, said first and second bent tab means cooperating to frictionally engage and retain a blade from a fuse or the like;
   first electrical connector means extending from said first element outwardly of said planar sheet means;
   second electrical connector means extending from said second element outwardly of said planar sheet means; and
   a dielectric protective layer surrounding said planar sheet means with the exception of at least said (1) space, (2) at least a portion of said first and second bent tab means and (3) said first and second electrical connector means.

2. The fuse retainer of claim 1 wherein:
   each said circuit has a rectangular shape with said first element having an "L" shaped configuration and said second element having a rectangular configuration and being located in the shoulder of the "L" shaped first element.

3. The fuse retainer of claim 2 wherein:
   said insulative gap is "L" shaped.

4. The fuse retainer of claim 1 wherein:
   said first and second resilient bent tab means each comprise three tabs with the first two tabs being coplanar and the third tabs being disposed across from, and offset from, said first two tabs.

5. The fuse retainer of claim 1 wherein:
   said first and second resilient bent tab means each comprise two tabs which are across from and offset from, each other.

6. The fuse retainer of claim 1 wherein:
   said planar sheet means comprises a single sheet of metal.

7. The fuse retainer of claim 1 wherein:
   said planar sheet means comprises a first and a second sheet of metal.

8. The fuse retainer of claim 7 wherein:
   said first and second resilient bent tab means each comprise at least one first tab extending from said first metal sheet and at least one second tab extending from said second metal sheet, said first and second tabs being disposed across from one another.

9. The fuse retainer of claim 8 wherein:
   said first metal sheet is thicker than said second metal sheet.

10. The fuse retainer of claim 8 wherein:
    said first and second tabs of each respective said first and second resilient bent tab means are normally in contact with each other.

11. The fuse retainer of claim 1 wherein:
    said planar sheet means has a substantially rectangular configuration; and
    said first and second electrical connector means comprise aligned spade-like terminal extending from opposed longitudinal sides of said planar sheet means.

12. The fuse retainer of claim 1 wherein:
    said dielectric protective layer comprises insulative polymeric films laminated to opposed planar surfaces of said sheet means.

* * * * *